(12) United States Patent
Zbiral et al.

(10) Patent No.: US 11,804,633 B2
(45) Date of Patent: Oct. 31, 2023

(54) DEGASSING UNIT AND ELECTRONICS HOUSING, IN PARTICULAR BATTERY HOUSING

(71) Applicant: MANN+HUMMEL GmbH, Ludwigsburg (DE)

(72) Inventors: Robert Zbiral, Marbach (DE); Axel Liebendoerfer, Untergruppenbach (DE); Thomas Jessberger, Asperg (DE); Markus Hanselmann, Lauffen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 193 days.

(21) Appl. No.: 17/358,225

(22) Filed: Jun. 25, 2021

(65) Prior Publication Data
US 2021/0320375 A1 Oct. 14, 2021

Related U.S. Application Data

(63) Continuation of application No. PCT/EP2019/084335, filed on Dec. 10, 2019.

(30) Foreign Application Priority Data

Jan. 4, 2019 (DE) ...................... 10 2019 100 094.7

(51) Int. Cl.
*H01M 50/30* (2021.01)
*H01M 50/333* (2021.01)
(Continued)

(52) U.S. Cl.
CPC ........... *H01M 50/394* (2021.01); *F16K 15/14* (2013.01); *H01M 50/308* (2021.01); *H01M 50/333* (2021.01)

(58) Field of Classification Search
CPC ............. H01M 50/333; H01M 50/394; H01M 50/308; H01M 50/317; H01M 2200/20
See application file for complete search history.

(56) References Cited

U.S. PATENT DOCUMENTS 3,860,453 A * 1/1975 Schmidt .............. H01M 50/668
429/86
5,388,615 A * 2/1995 Edlund .............. B65D 51/1644
137/859

(Continued)

FOREIGN PATENT DOCUMENTS

CN 105702898 A 6/2016
CN 206349430 U 7/2017
(Continued)

*Primary Examiner* — Sadie White
*Assistant Examiner* — Kayla Elaine Clary (57) ABSTRACT

A degassing unit to be connected fluid-tightly to a pressure compensation opening of an electronics housing has a base body with gas passage opening. A semipermeable membrane, fastened fluid-tightly to a membrane carrier, allows gaseous media to pass from an environment into the electronics housing and in reverse but prevents passage of liquid media and solids. In normal operation, the membrane covers the gas passage opening. An axial seal circumferentially extends about the gas passage opening. The membrane carrier is moveable relative to the base body and, in normal operation, is pressed by axial force seal-tightly against the axial seal. The membrane carrier, when a predetermined pressure difference between housing interior and environment is surpassed, lifts off the base body to release an emergency degassing opening surrounding the membrane. The axial seal is a lip seal and made of a material softer than a material of the membrane carrier.

26 Claims, 4 Drawing Sheets

(51) Int. Cl.
*H01M 50/308* (2021.01)
*F16K 5/14* (2006.01)
*F16K 15/14* (2006.01)

(56) References Cited

U.S. PATENT DOCUMENTS

| | | |
|---|---|---|
| 9,428,304 B2 | 8/2016 | Scagliarini et al. |
| 10,128,476 B2 | 11/2018 | Umeyama et al. |
| 10,923,695 B2 | 2/2021 | Ahn et al. |
| 2001/0049051 A1* | 12/2001 | Jones .................. H01M 10/121 |
| | | 429/57 |
| 2003/0118892 A1* | 6/2003 | Ray, Jr. ............... H01M 50/342 |
| | | 429/185 |
| 2004/0137316 A1 | 7/2004 | Streuer |
| 2013/0034757 A1* | 2/2013 | Doyle .................. H01M 50/35 |
| | | 429/89 |
| 2013/0098912 A1* | 4/2013 | Scagliarini ............. B65D 25/20 |
| | | 220/89.1 |
| 2016/0036025 A1 | 2/2016 | Hofer |
| 2019/0178401 A1 | 6/2019 | Zaggl |

FOREIGN PATENT DOCUMENTS

| | | | | |
|---|---|---|---|---|
| CN | 108735949 A | 11/2018 | | |
| CN | 208298911 U | 12/2018 | | |
| DE | 102012022346 B4 * | 3/2018 | .......... | H01M 2/0237 |
| JP | H10106523 A | 4/1998 | | |

* cited by examiner

DEGASSING UNIT AND ELECTRONICS HOUSING, IN PARTICULAR BATTERY HOUSING

CROSS-REFERENCE TO RELATED APPLICATIONS

This application is a continuation application of international application No. PCT/EP2019/084335 having an international filing date of 10 Dec. 2019 and designating the United States, the international application claiming a priority date of 4 Jan. 2019 based on prior filed German patent application No. 10 2019 100 094.7, the entire contents of the aforesaid international application and the aforesaid German patent application being incorporated herein by reference.

BACKGROUND OF THE INVENTION

The invention concerns a degassing unit and an electronics housing, in particular a battery housing, in particular of a traction battery of a motor vehicle.

Housings for receiving electronic components such as e.g. battery cells and the like cannot be closed completely gas-tightly relative to the environment because, on the one hand, due to temperature fluctuations (for example, by heat introductions by charging or discharging battery cells) and, on the other hand, due to naturally occurring air pressure fluctuations, in particular in mobile systems, a gas exchange between interior and exterior space must be made possible in order to prevent impermissible mechanical loads of the housing, in particular bursting or bulging of the housing. It is however equally important that the penetration of foreign bodies, dirt, and moisture (water) is effectively prevented.

Therefore, pressure compensation devices are known which comprise semipermeable membranes which are gas-permeable but liquid-impermeable.

When inside the housing a pressure peak occurs, for example, upon failure of a battery cell in a battery housing, this pressure must be released as quickly as possible because otherwise the housing might become damaged.

As a simplest configuration of a burst protection, for example, in case of lead batteries, it is known to employ burst disks in the meaning of a "rated break point", in particular of a metallic sheet metal material, or safety flaps or valves which are inserted into a housing opening.

In contrast thereto, in case of high-voltage batteries, in particular lithium-based traction batteries with significantly higher storage capacities and power densities, highly specific pressure compensation devices are used which are optimized for fulfilling the aforementioned objects.

DE 10 2012 022 346 B4 discloses a degassing unit for a battery housing that comprises a base body comprising a gas passage opening which is covered by a semipermeable membrane that is permeable for gas but impermeable for liquids, wherein the membrane is stationarily and fluid-tightly connected to the base body, in particular welded. The base body is fluid-tightly connectable to a pressure compensation opening of the battery housing. A gas exchange in normal operation is ensured by the membrane due to its semipermeable properties while, for realization of an emergency degassing function, an emergency degassing spike, pointing toward the membrane, is arranged at a cover body and causes perforation and rupture of the membrane upon surpassing a limit expansion induced by an interior housing pressure; thus, a sudden pressure compensation from the interior to the environment is possible. At an interior side that is facing in the mounted state toward the battery housing, an inner protective lattice is connected to the base body which is to prevent an ingress of foreign bodies into the battery housing.

Moreover, DE 10 2011 080 325 A1 describes a similar degassing unit with a membrane that is stationarily held at a base body in which the emergency degassing function is also achieved by a targeted puncture of the membrane by means of a spike.

Furthermore, DE 10 2017 003 360 B3 discloses a degassing unit in which the functions emergency degassing and venting in the normal state are functionally separated. While venting in the normal state is realized by a nonwoven layer stationarily centrally secured at the base body, the emergency degassing is achieved by an umbrella valve that can lift off upon surpassing a limit pressure and opens a radially outwardly positioned annular gap of the base body for emergency degassing.

The degassing units known from the prior art which provide already venting in the normal state as well as an emergency degassing have the disadvantage that the emergency degassing pressure cannot be adjusted sufficiently precisely and that the flow cross section available for the emergency degassing is greatly limited. Devices in which the membrane, when a limit expansion is surpassed, is perforated by a spike and caused to rupture are very robust but have the disadvantage that the emergency degassing pressure depends greatly on the manufacturing tolerance dependent distance of the membrane to the tip of the spike and on manufacturing tolerance-dependent deviations of the membrane thickness. The inner pressure resistance of the battery housing must therefore be dimensioned with respect to the worst case of this tolerance consideration (=maximum distance membrane to spike tip and maximum membrane thickness) which, by trend, can lead to the battery housing being mechanically excessively dimensioned. Moreover, such emergency degassing units which operate according to the principle of causing a rated break point of the membrane cannot be reversibly used, i.e., must be exchanged after one-time triggering.

The solution that is disclosed in DE 10 2017 003 360 B3 is in principle reversible after an emergency degassing but entails the problem, in addition to the problem that the emergency gas pressure can only be insufficiently determined due to tolerances, that the flow cross section that is available for emergency degassing is only the outer annular gap while the central region which is covered by the nonwoven is not available for this purpose, or rather the pressure loss that is caused by the nonwoven does not allow for a sufficiently high volume flow passage. Moreover, the opening behavior of the degassing unit disclosed therein is greatly temperature dependent and dependent on material properties that change over time (aging).

Moreover, DE 10 2014 111 041 A1 discloses a degassing unit with a displaceable membrane carrier that is pressed against a base body by spring elements that are integrated in the membrane carrier as a one-piece configuration. The membrane is provided in this context at an inner side that is facing the base body and is thus also compressed. A disadvantage of this is that the contact between base body and membrane carrier cannot reliably prevent the penetration of foreign bodies and water.

SUMMARY OF THE INVENTION

It is therefore object of the present invention to provide a degassing unit for an electronics housing, in particular for a battery, in particular for a traction battery of a motor vehicle, that is characterized in that the emergency degassing pressure can be more precisely determined and that the degassing unit is reversibly usable after an emergency degassing event.

This object is solved by a degassing unit for an electronics housing, in particular for a battery, in particular for a traction battery of a motor vehicle, that comprises a base body connectable fluid-tightly to a rim of a pressure compensation opening of the electronics housing and comprising at least one gas passage opening which, in a normal operating state of the degassing unit, is covered by a semipermeable membrane that enables passage of gaseous media from an environment into the electronics housing and in reverse, but prevents passage of liquid media and/or solids, wherein the degassing unit is characterized in that the membrane is fastened fluid-tightly to a membrane carrier that is movable in relation to the base body and, in the normal operating state, is pressed by an axial force seal-tightly against an axial seal circumferentially extending about a rim of the gas passage opening of the base body so that the membrane carrier, when a predetermined pressure difference between an interior of the electronics housing and an environment is surpassed, is liftable off the base body to release at least one emergency degassing opening surrounding the membrane in order to transfer the degassing unit into an emergency degassing state, wherein the axial seal is embodied as a lip seal and wherein the seal is comprised of a softer material than the membrane carrier.

The object is further solved by an electronics housing, in particular battery housing, in particular of a traction battery of a motor vehicle, that comprises at least one housing wall with at least one pressure compensation opening, wherein in the electronics housing preferably battery cells can be arranged, wherein the pressure compensation opening is closed by a degassing unit, characterized in that the degassing unit is a degassing unit according to the invention as claimed.

Preferred further embodiments of the invention are disclosed in the dependent claims.

Advantages of the invention result from the description and the drawings. Also, the aforementioned and still to be explained features in accordance with the invention can be used individually by themselves or a plurality thereof combined in any combinations. The illustrated and described embodiments are not to be understood as a complete listing but have instead an exemplary character for the description of the invention.

According to a first embodiment of the invention, the degassing unit for an electronics housing, in particular for a battery, in particular for a traction battery of a motor vehicle, comprises a base body that is fluid-tightly connectable to a rim of a pressure compensation opening of the electronics housing. The base body comprises at least one gas passage opening which, in a normal operating state of the degassing unit, is covered by a semipermeable membrane wherein the membrane enables passage of gaseous media from an environment into the electronics housing and in reverse, but prevents penetration of liquid media. The membrane is fluid-tightly fastened to a membrane carrier which is movable relative to the base body, which in the normal operating state is pressed by an axial force seal-tightly against an axial seal surrounding a rim of the gas passage opening of the base body and which, when a predetermined pressure difference between an interior of the electronics housing and an environment is surpassed, can be lifted off with release of at least one emergency degassing opening surrounding the membrane in order to transfer the degassing unit into an emergency degassing state in this way. The axial seal is designed as a lip seal and is comprised of a softer material than the membrane carrier and/or the base body.

According to the present patent application, the term degassing unit has been selected for the device according to the invention. However, it is of course understood that the device according to the invention enables likewise venting of an interior of the electronics housing through the (porous) membrane in the normal operation.

The relative terms "interior" and "exterior" used herein relate to a mounted state in respect to the electronics housing wherein "interior" means pointing toward the electronics housing and "exterior" pointing toward the environment.

The degassing unit according to the invention can comprise a housing seal for ensuring an optimal sealing action at the interface base body-battery housing, in particular in the form of an O-ring which can be compressed in the mounted state axially in relation to a housing exterior wall or radially in a pressure compensation opening of the battery housing.

The base body and/or the membrane carrier can be comprised substantially of plastic material, in particular thermoplastic plastic material, and in particular injection molded. Preferred materials are polypropylene, polybutylene terephthalate or polyamide, each comprising reinforcement fibers, in particular glass fibers.

The membrane can be connected to the membrane carrier that is movable relative to the base body by gluing and/or welding, in particular by ultrasonic welding. In this way, an inexpensive manufacture as well as a sufficient seal-tightness can be achieved. Alternatively, the membrane can also be glued along a circumferentially extending sealing line to the membrane carrier.

Due to the construction in accordance with the invention with a membrane carrier that is movable relative to the base body and to which the semipermeable membrane is attached, a significantly more precisely determinable emergency degassing pressure results in comparison to the prior art. In the device according to the invention, the emergency degassing is not achieved by a perforation of the membrane and its rupture, but in that the membrane carrier, by action of a housing interior pressure, is lifted off the base body whereby at least one emergency degassing opening is released. The emergency degassing pressure is therefore neither determined by the tolerance-affected membrane thickness nor by the configuration of the distance of a spike from the membrane surface but solely by the influencing parameters, on the one hand, of the employed membrane surface and, on the other hand, the contact force with which the membrane carrier is pressed against the base body for achieving the sealing effect. The membrane remains intact upon transfer of the degassing unit into the emergency degassing state and, after the emergency degassing pressure has been undershot again, can reversibly return together with the membrane carrier so that the degassing unit is ready for use again.

In order to enable, even after long periods of time without emergency degassing event, a fail-safe operation and in particular to prevent sticking of seals that participate in the sealing action of the membrane carrier in relation to the base body, particular focus is to be placed onto the selection of the sealing materials. As "softer" materials than the membrane carrier and/or base body, in particular silicone rubber (VMQ), fluoro-rubber (FKM), ethylene propylene diene rubber (EPDM) have been found to be suitable sealing materials. In addition, for achieving a permanent seal-tight connection, it can be expedient to change the properties of the surface of the seal appropriately by a coating, in particular lacquer coating.

It is understood, of course, that the seal is to be understood herein as a device component that is different from the membrane. In contrast to the prior art, by providing a separate axial lip seal, it can be ensured that the sealing contact between base body and membrane carrier exhibits a high seal tightness in regard to penetration of foreign bodies and water, in particular in case of pressure loading (traveling through water, cleaning with high-pressure cleaners).

In contrast to a radial seal, an axial seal provides the advantage that the release forces are significantly smaller. While a radial seal, in particular when using radially sealing O-rings, may "stick" to the sealing seat, an axial lip seal enables at any point in time a release with low axial force.

As a further advantage, the degassing unit according to the invention enables a flow cross section for emergency degassing that is as large as possible. After the membrane carrier has lifted off the gas passage opening of the base body, essentially the complete cross section of the gas passage opening is available also for emergency degassing. This is beneficial for a quick pressure release with a minimization of the expectable damages at the battery housing.

Finally, the emergency degassing pressure not only can be determined with a reduced fluctuation range, but it is also possible to achieve triggering at significantly smaller pressure differences than before, i.e., a very differentiated response behavior can be achieved.

The aforementioned advantages associated with the invention contribute to being able to provide electronics housings, in particular battery housings, which are provided with a degassing unit in accordance with the invention, with thinner walls, as needed, and thus in a material-saving way and thus also less expensively.

For the semipermeable membrane all materials can be used that have a gas permeability for venting in the normal operation and a sufficiently high water impermeability. As a preferred material for the semipermeable membrane, polytetrafluoroethylene (PTFE) can be used. The semipermeable membrane comprises an average pore size that can lie between 0.01 micrometers and 20 micrometers. The porosity lies preferably at approximately 50%, the average pore size amounts preferably to approximately 10 micrometers.

The semipermeable membrane can be designed preferably as a film-type or film-shaped or disk-shaped thin membrane. The gas-permeable membrane comprises a membrane surface effective for gas permeation that has preferably a rectangular or round outer contour at its outer circumference. It is however understood that the outer circumference of the membrane can also be designed differently. The membrane is preferably a thin flat membrane whose membrane surfaces that are effective for gas permeation and face away from each other are substantially parallel to each other and are preferably embodied substantially planar.

The membrane thickness of the membrane is very much smaller than its remaining outer dimensions. The membrane can span a minimum width and/or a minimum length or a minimum outer diameter of equal to or larger than 20 mm, preferably of equal to or larger than 30 mm, in particular of equal to or larger than 40 mm. The membrane thickness can be in particular at least 20 times, preferably at least 40 times, in particular at least 100 times, smaller than the minimum width and/or the minimum length and/or the minimum outer diameter of the membrane. The membrane thickness can amount to 1 micrometer to 5 millimeters, wherein a membrane thickness of 0.1 to 2 mm, in particular 0.15 to 0.5 mm, is preferred.

According to a preferred further embodiment, at the membrane carrier, at an inner side facing the base body, or at the base body, at an exterior side that is facing the membrane carrier, a seal which is circumferentially extending about the gas passage opening, preferably a lip seal, can be arranged which in the normal operating state seals the gas passage opening in relation to the membrane. In a particular embodiment, the seal can be injection molded to the membrane carrier or base body, for example, by a 2-component injection molding method. Alternatively, it can also be glued on.

Preferably, the lip seal comprises at least one sealing lip with an essentially linear sealing line which generates adherence effects as small as possible and does not stick even after a longer period of time. Preferably, the seal is held or fixed in a circumferentially extending seal receiving groove of the base body. Alternatively or additionally, the seal can also be glued to the base body or integrally formed thereon by a 2-component injection molding method. The seal receiving groove is preferably arranged at an exterior side of the base body that is facing the membrane carrier so as to circumferentially extend about the gas passage opening. On an oppositely positioned side of the membrane carrier facing the base body, a sealing lip receiving groove can be provided which can be in particular conically embodied and which enables, due to the cone effect (effect of the conicity) an optimized sealing action by means of the sealing lip. Alternatively, the seal receiving groove can also be present at the membrane carrier at its inner side which is facing the base body.

The at least one sealing lip can be positioned in relation to a longitudinal axis at an angle between 10° and 60°, preferably between 20° and 45°. This reduces the axial forces required for deformation of the sealing lip and ensures in this way a reliable sealing action by use of minimal axial forces.

In yet a further preferred embodiment, the membrane can be connected circumferentially to the membrane carrier in a fluid-tight manner, in particular circumferentially welded, wherein the membrane is present preferably at an inner side of the membrane carrier which is facing the base body. A contact with or connection to the inner side of the membrane carrier has the advantage that the membrane upon inner pressure action is essentially held with form fit relative to the membrane carrier and the connection (welding, gluing or the like) is not loaded by tensile force; this is important in particular in case of use of PTFE materials that are already difficult to join. In order to prevent an impermissibly strong bending or "bulging" of the membrane also in case of inner pressure action which can lead to its destruction, the membrane carrier can comprise an outer protective lattice which spans across the membrane surface externally at least partially but is fluid-permeable with a sufficiently large surface proportion in order to enable gas exchange in the normal operation.

According to yet a further also preferred embodiment, the membrane carrier can be pressed by at least one spring element against the base body. The spring element can be preferably a pressure spring, in particular a spiral spring. The invention is however not limited thereto. Instead, also further spring elements are encompassed which are not mentioned explicitly here, such as plate springs and/or spring tongues. By a suitable selection of the spring stiffness of the spring element, the degassing pressure can be adjusted very precisely and reproducibly. In addition, the triggering characteristics can be adapted further by the use of springs with tailored spring characteristic lines, wherein also progressive but in particular degressive spring characteristic lines are possible. By means of a degressive characteristic line, it is possible in this context to adjust a targeted sluggish response behavior while by means of a progressive characteristic line a faster response behavior can be realized.

Moreover, the degassing unit can comprise a cover hood which is connected to the base body, wherein the cover hood preferably comprises at least one venting opening. The cover hood ensures that the membrane cannot be damaged from the exterior either by foreign bodies, for example, pointed objects such as screwdrivers or the like, or by means of high-pressure cleaners and/or steam cleaners, and contributes thus effectively to a high IP protection class.

According to yet another embodiment, it is provided that the spring element with one end is supported at an inner surface of the cover hood that is facing the membrane carrier and with the other end at an outer surface of the membrane carrier that is facing the cover hood. The cover hood comprises preferably a spring guide or a spring plate at its inner side that is facing the membrane carrier which is designed to prevent an in particular radial displacement of the spring. The spring guide or the spring plate comprises for this purpose particularly preferred a sleeve section which extends axially and which, in case of a spiral spring as spring element, supports coaxially the spring. The membrane carrier can also comprise a spring guide or a spring plate which in a preferred manner is present at the exterior side of the membrane carrier that is facing the cover hood.

A further also preferred embodiment provides that the cover hood engages across the outer circumference of the base body at least partially in circumferential direction and preferably is fastened by means of a locking element engagement at the outer circumference of the base body. Herein, "engaging across" is associated with an axial overlap. By means of the connection of the cover hood with the base body, the spring force which is introduced according to some embodiments into the cover hood can be transmitted to the base body. For attachment of the cover hood at the base body, other fastening means are also conceivable however, for example, form-fit or friction-fit fastening means such as screws or undercuts.

Moreover, it can be provided that between the base body and the membrane carrier at least one linear guide is present that is configured to axially guide the membrane carrier upon transfer from the normal operating state into the emergency degassing state, and in reverse. This has the advantage that comparatively large strokes of the membrane carrier can be realized without there being the risk that it tilts. Large strokes have in turn the decisive advantage that a flow cross section as large as possible can be provide for emergency degassing.

The linear guide is preferably embodied as a combination of at least one corresponding pin and at least one bore, wherein preferably at least one bore is present at an exterior side of the base body that is facing the membrane carrier and a pin corresponding to the bore and guided in the bore is present at the inner side of the membrane carrier facing the base body. The invention is however not limited to this but also encompasses inverted embodiments with pins at the base body and bores at the membrane carrier. The cross section shape of the bores and pins is not limited to circular cross sections but also encompasses any complementary shapes that are capable of providing a linear guiding action of the membrane carrier in relation to the base body, for example, a combination of a groove as a "bore" and a complementary blade as "pin"; in addition, other, at least in sections, polygonal or elliptical cross section shapes are possible.

Moreover, it can be provided, which is also preferred, that the gas passage opening of the base body is covered, at least partially, by a fluid-permeable protective lattice, preferably covered across the entire surface. The protective lattice serves as ingress protection into an interior of the electronics housing so that objects, for example, screwdrivers or the like, cannot pass into the interior. This is in particular important because traction batteries of motor vehicles are operated frequently in the high-voltage range and this presents dangers. The protective lattice can comprise a plurality of spaced-apart lattice stays whose minimum distance is to be selected such that ingress can be prevented safely. The lattice stays can be arranged in a rectangular pattern or as a combination of circumferentially extending and radially extending lattice stays.

The protective lattice can be designed in particular as one piece together with the base body or connected thereto as a separate component, in particular at an inner side of the base body which is facing the electronics housing in the mounted state of the degassing unit. The protective lattice can preferably comprise a metal or a plastic material or can be comprised thereof, preferably polypropylene and/or polybutylene terephthalate, each preferably comprising reinforcement fibers, in particular glass fibers. A protective lattice of metal has the advantage that even after a high temperature action (e.g. fire) the protective function is maintained. In a separate embodiment of the protective lattice, the latter can be, for example, screwed, riveted or connected by means of hot stamp to the base body.

As materials for the base body and/or the cover hood, plastic materials are conceivable, in particular thermoplastic plastic materials that can be processed by injection molding. Preferably, the base body and/or the cover hood is comprised of polypropylene, polybutylene terephthalate or polyamide, each comprising reinforcement fibers, in particular glass fibers, or at least comprises one of these materials.

Moreover, the base body can comprise at least one connecting means with which the degassing unit is connectable to the electronics housing, wherein the connecting means is preferably embodied as a bayonet connecting means or as a thread connecting means. Particularly preferred, the bayonet connecting means projects axially away from an inner side of the base body which, in the mounted state, is facing the electronics housing. In an embodiment as a threaded connecting means, the connecting means can be preferably formed by one or a plurality of thread bushing(s) (in particular thread insert in plastic material).

Alternatively or additionally, the degassing unit can comprise a housing seal which surrounds the gas passage opening of the base body at its inner side circumferentially. The housing seal can be embodied as an axial or radial seal, i.e., be present in particular at an end face (in case of the axial seal) or at a wall surface (in case of the radial seal). The housing seal can be embodied as an O-ring, which is received in a corresponding groove of the base body, or as a seal component attached by injection molding. An arrangement of the housing seal in axial configuration is preferred wherein, particularly preferred, the housing seal surrounds a bayonet connecting means which in particular projects away axially.

A further aspect of the invention concerns an electronics housing, in particular a battery housing, in particular a traction battery of a motor vehicle. As further possibilities of use of the degassing unit according to the invention, aside from traction batteries, for example, switch cabinets or transformer housings are conceivable. The electronics housing has at least one housing wall with a pressure compensation opening, wherein in the electronics housing preferably battery cells can be arranged and wherein the pressure compensation opening is closed by a degassing unit according to the invention so that in a normal operating state a gas exchange between an interior of the electronics housing and the environment is possible but penetration of moisture (water), dirt, and foreign bodies is effectively prevented, and a quickly triggerable emergency degassing function is provided which in case of a pressure increase in the interior prevents damage or destruction of the wall of the electronics housing.

According to an embodiment, at least one counter connecting means corresponding to the bayonet connecting means of the degassing unit can be present at the housing wall in a region surrounding the pressure compensation opening.

Finally, the housing wall can comprise at an exterior side a sealing surface which is circumferentially extending about the pressure compensation opening at which the housing seal of the degassing unit is resting in a mounted state. The sealing surface is preferably embodied as a region of the wall of the electronics housing with deviations as small as possible with regard to flatness and with minimal roughness. Suitably, the electronics housing or at least its wall comprises a metal material or is comprised thereof so that the sealing surface can be obtained simply by mechanical machining with respect to the aforementioned properties.

DESCRIPTION OF PREFERRED EMBODIMENTS

Figure 1:
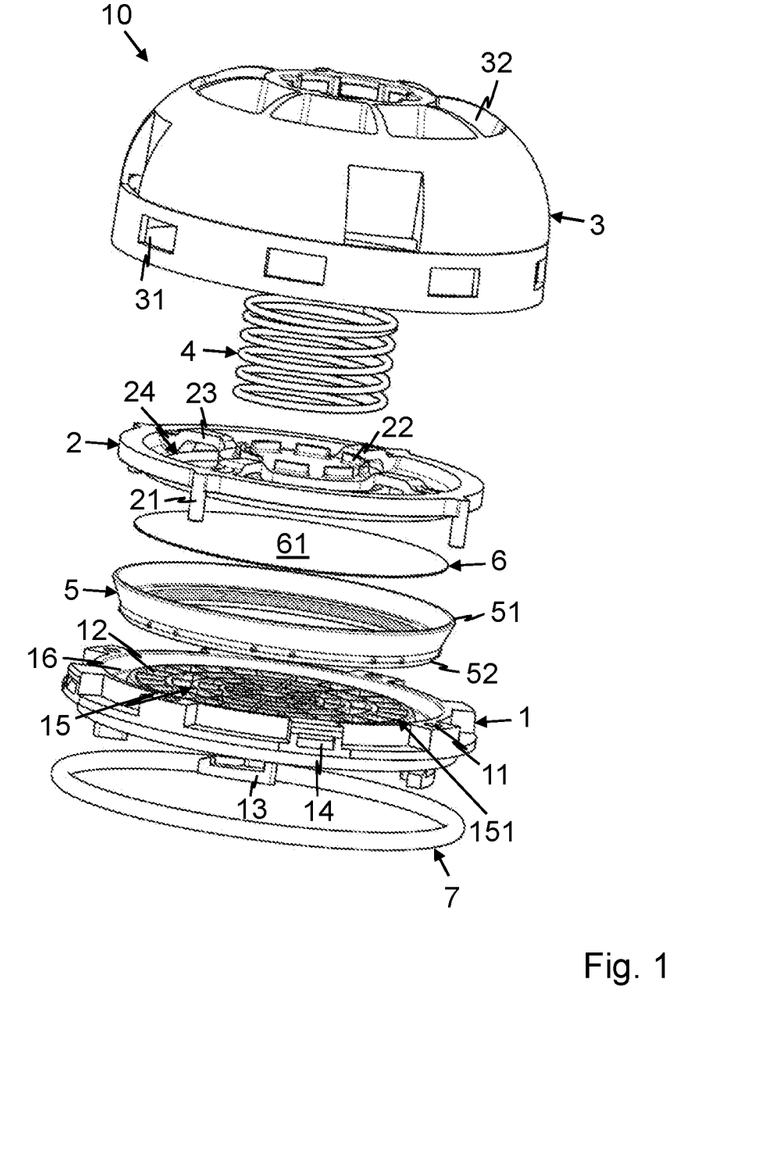
FIG. 1 shows an isometric exploded view of a degassing unit according to the invention.

In FIG. 1, the degassing unit 10 according to the invention is shown in an isometric exploded illustration. It comprises a base body 1 which is connectable by bayonet connecting means 13, which project axially away from an inner end face of the base body 1, to the rim of a pressure compensation opening of an electronics housing, in particular of a battery housing of a traction battery. For fluid-tight sealing of the base body 1 in relation to the wall of the electronics housing, a housing seal 7 is provided which is embodied here as an axially acting O-ring. The base body has a gas passage opening 15 through which a pressure compensation in the normal operating state is realized as well as, in an emergency degassing state, pressure can escape from the battery housing. The gas passage opening 15 is covered by a fluid-permeable protective lattice 12 which provides an ingress protection and prevents that voltage-conducting components in the interior of the electronics housing are touched and/or damaged by pointed objects. The protective lattice 12 has a plurality of lattice stays which are arranged circumferentially as well as in radial direction and form a net of lattice stays. In the present embodiment, the protective lattice 12 is formed as one piece together with the base body 1, in particular injection molded as one piece.

Furthermore, the degassing unit 10 comprises a membrane carrier 2, which in axial direction can be displaced relative to the base body 1, i.e., it comprises a degree of freedom of movement in axial direction. The membrane carrier 2 carries at its inner side facing the base body 1 a semipermeable membrane 6 which is permeable for gaseous fluids but prevents the passage of solid bodies and liquids. The semipermeable membrane 6 is fluid-tightly connected to the membrane carrier 2 around the gas passage opening 24 of the membrane carrier 2, preferably welded or glued. In the normal operating state of the degassing unit 10, the membrane carrier 2 is axially compressed by a spring element 4, here a spiral spring, in a direction oriented toward the base body 1 so that a circumferentially extending seal 5 provided in axial direction between the membrane carrier 2 and the base body 1 seals the membrane carrier 2 in relation to the base body 1. In the normal operating state in which a gas exchange between interior of the electronics housing and the environment takes place (due to air pressure fluctuations and/or temperature changes), it is therefore exclusively the membrane surface 61 that is available for flow.

When the inner pressure in the electronics housing increases, the pressure force which is acting on the membrane surface 61 increases by the same amount so that, beginning at a certain limit pressure, the pressure force which is acting on the membrane surface 61 and the spring force axially pressing the membrane carrier 2 into contact will cancel each other so that upon further inner pressure increase the membrane carrier 2 together with membrane 6 is lifted axially off the base body 1 and releases at least one emergency degassing opening surrounding the membrane 6. This state is referred to as emergency degassing state and is illustrated in more detail in FIG. 3. Reasons for a strong inner pressure increase can be a sudden temperature increase and/or sudden gas development in the electronics housing, which can happen in particular in case of traction batteries because cell defects cannot be completely excluded.

The spiral spring 4 which exerts the contact force on the membrane carrier 2 is supported with one end at the inner side of the cover hood 3 and with the other end at the exterior side of the membrane carrier 2 facing the cover hood 3. The cover hood 3 is connected to the base body 1 for dissipating the spring forces; it circumferentially engages with a circumferential rim the base body 1 radially outwardly and is connected with the latter with form fit by locking element engagements. The locking element engagement is realized by a combination of corresponding locking hooks 14 at a wall surface of the base body 1 and locking openings 31 in a wall surface of the cover hood 3. The cover hood 3 has a plurality of circumferentially distributed venting openings 32 through which gases can flow into and out of the electronics housing in the normal operating state as well as in the emergency degassing state.

In order for the spiral spring 4 to be safely held in radial direction in the normal operating state as well as in the emergency degassing state, at the outer surface of the membrane carrier 2 that is facing the cover hood 3 a spring guide 22 is provided which is comprised of a plurality of circumferentially distributed elevations with axial extension which are surrounded by the spiral spring 4. In other embodiments, the spiral spring can also be present within the spring guide 22 and/or the spring guide can be embodied as a continuous sleeve-shaped projection. The spring guide 22 is connected by radially extending connecting elements, here stop bridges 23, to the outer circumference of the membrane carrier 2 wherein the gas passage opening(s) 24 of the membrane carrier 2 is (are) formed in a ring gap between outer circumference and spring guide 22.

For limiting the stroke of the membrane carrier 2 between the normal operating state and the emergency degassing state, the stop bridges 23 are embodied to project in axial direction in the direction of the cover hood so that for maximum opening (=maximum stroke of the membrane carrier) they contact respectively corresponding counter stop surfaces on an inner side of the cover hood 3 facing the membrane carrier 2.

The seal 5, present between membrane carrier 2 and base body 1, comprises two regions, a fastening region 52 with which it is received in the circumferentially extending seal receiving groove 16 of the base body 1, and a sealing lip 51 with a reduced material thickness in comparison to the fastening region 52. The fastening region 52 and the sealing lip 51 are each embodied to extend circumferentially so that the seal forms an annular seal. The fastening region 52 of the seal 5 is received in a seal receiving groove 16 of the base body 1 which surrounds in radial direction outwardly the gas passage opening 15. The sealing lip 51 is positioned at an end of the seal 5 which is facing away axially from the fastening region 52 and is embodied to seal-tightly rest in the normal operating state at a sealing counter surface at a side of the membrane carrier 2 facing the base body 1. In this respect, reference is being had to FIG. 2 in which this can be seen well. At the sealing counter surface, the membrane carrier 2 has a sealing lip receiving groove 25 which is provided with a circumferentially extending guide surface that is slanted relative to the longitudinal axis and is radially inwardly positioned; the guide surface guides and centers the sealing lip 51 of the seal 5 upon return of the degassing unit 10 from the emergency degassing state into the normal operating state.

As has been described herein already, one of the advantages of the present invention is the large flow cross section of the emergency degassing opening(s) in the emergency degassing state which is achieved by a large stroke of the membrane carrier 2 relative to the base body 1. In order for the membrane carrier 2 not to tilt and/or be displaced impermissibly in radial direction even at maximum stroke, a linear guide is provided which is formed by bores 11 and pins 21 which correspond with each other. The pins 21 are present at the membrane carrier 2 and extend in axial direction freely inwardly toward the base body 1. The pins 21 are guided each in the bores 11 of the base body 1 which are open outwardly in axial direction toward the membrane carrier 2. The length of the pins 21 in regard to the maximum stroke is dimensioned such that even for maximum stroke they are still guided with a predetermined minimum length in the bores 11. The linear guides ensure also that the sealing lip 51 of the seal 5 is always contacting the counter sealing surface provided for it in the sealing lip receiving groove 25 of the membrane carrier and is not radially displaced which could lead to leakages in operation. In this way, it is thus ensured that the degassing unit 10 after completed transfer into the emergency degassing state can return without problem into the normal operating state, i.e., the reversible functionality is enabled decisively by the linear guide.

Figure 2:
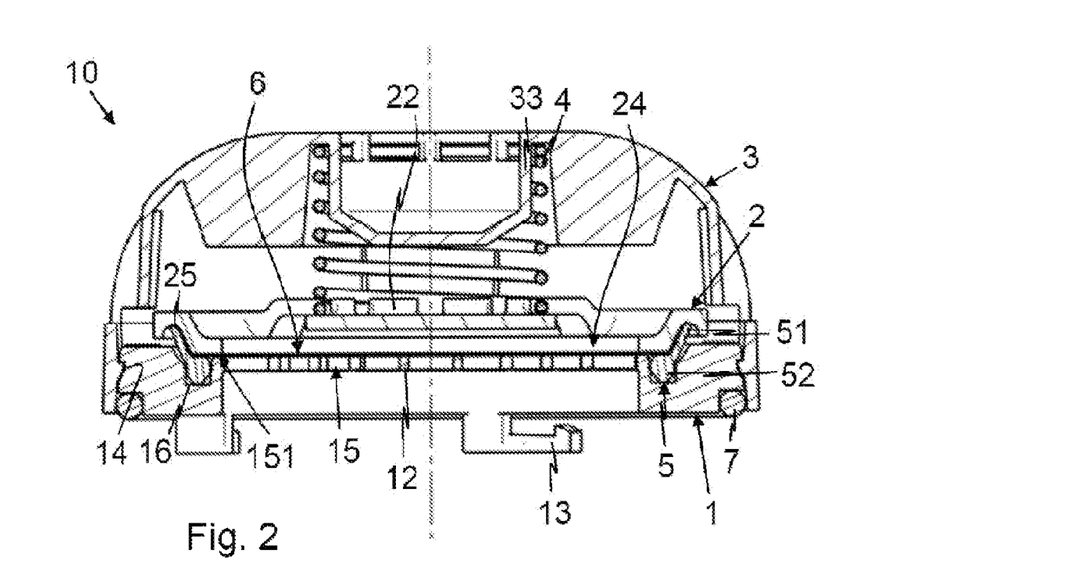
FIG. 2 shows a longitudinal section view of the degassing unit according to the invention in the normal operating state.

In FIG. 2, the degassing unit 10 is illustrated in a longitudinal section in the normal operating state. The membrane carrier 2 is pressed axially by the pressure spring 4 supported at the cover hood 3 with intermediate positioning of the seal 5 against the base body 1. The sole gas exchange is realized through the membrane 6 which can be flowed through serially relative to the gas passage opening 15 of the base body 1 and the gas passage opening 24 of the membrane carrier 2. Also, the locking element engagement for attachment of the cover hood 3 at the base body 1 can be seen well, wherein the locking hooks 14 provided at the base body 1 are designed as radial projections. The pressure spring 4 is also guided, on the part of the cover hood 3, radially by a spring guide 33 which is embodied as a securing sleeve 33 which is projecting coaxially into the pressure spring 4. In the normal operating state, the membrane 6, which is circumferentially welded so as to surround the gas passage opening 24 to an inner side of the membrane carrier 2, is contacting the protective lattice 12 of the base body 1.

Figure 3:
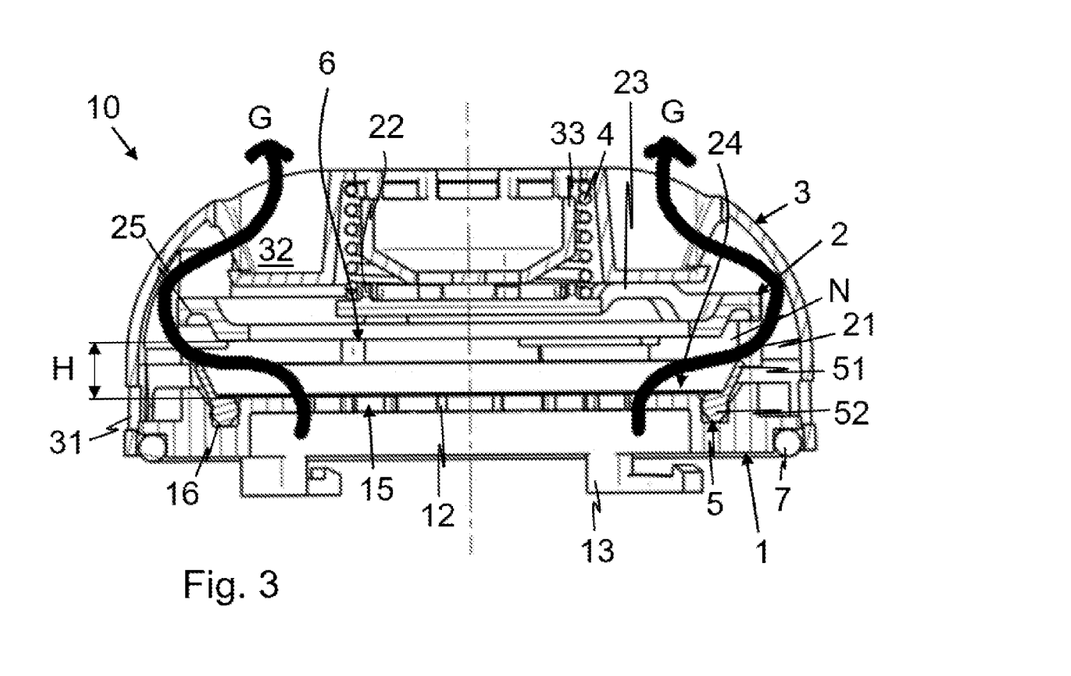
FIG. 3 shows a longitudinal section view of the degassing unit according to the invention in the emergency degassing state.

When the degassing unit 10 is transferred by the above-described increase of the inner pressure in the electronics housing into the emergency degassing state, the membrane carrier 2 under the effect of this pressure is displaced axially in the direction of the cover hood 3 (outwardly); this state is illustrated in FIG. 3. The maximum stroke H of the membrane carrier 2 relative to the base body 1 is identified at H so that a circumferentially extending emergency degassing opening N is released which makes it possible that the housing interior pressure can pass along the emergency degassing path G into the environment. The flow cross section of the emergency degassing opening N is determined by the axial gap between the sealing lip 51 and the corresponding counter sealing surface in the sealing lip receiving groove 25 of the membrane carrier 2. The emergency degassing path G extends from the emergency degassing opening N along the inner contour of the cover hood 3 and finally through the venting openings 32.

When the housing inner pressure drops again below a predetermined closure pressure, i.e., the spring force surpasses again the pressure force on the membrane surface 61, the membrane carrier 2 is returned axially again (hysteresis) and is supported in this context by the linear guide so that the sealing lip 51 can contact exactly centered the counter sealing surface in the sealing lip receiving groove 25 with a sealing contact.

Figure 4:
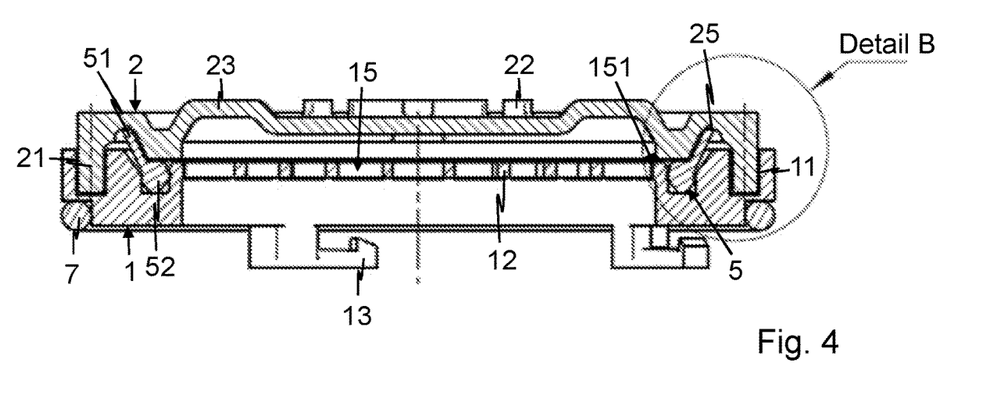
FIG. 4 shows a longitudinal section view of the degassing unit according to the invention in the normal operating state with removed cover hood.
Figure 5:
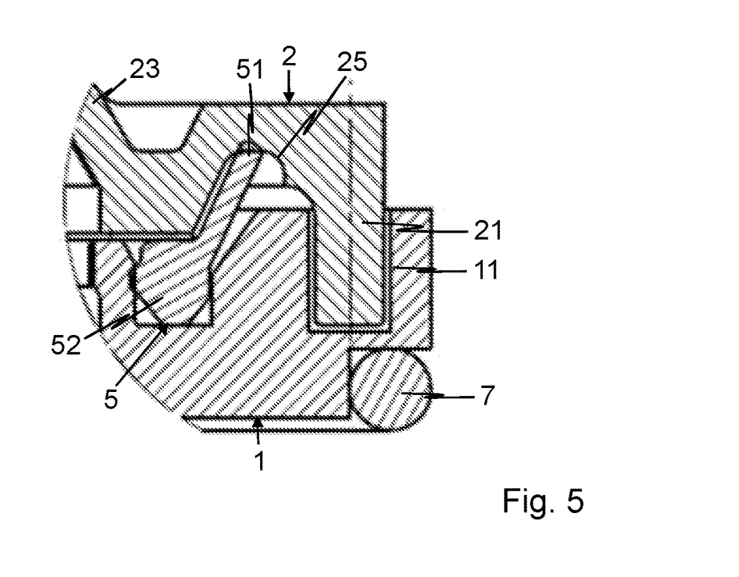
FIG. 5 shows detail B of FIG. 4.

This sealing contact is illustrated in detail in FIG. 4 and FIG. 5 wherein the cover hood 3 and the pressure spring 4 are not shown for simplifying the representation. FIG. 5 shows detail B of FIG. 4.

Figure 6:
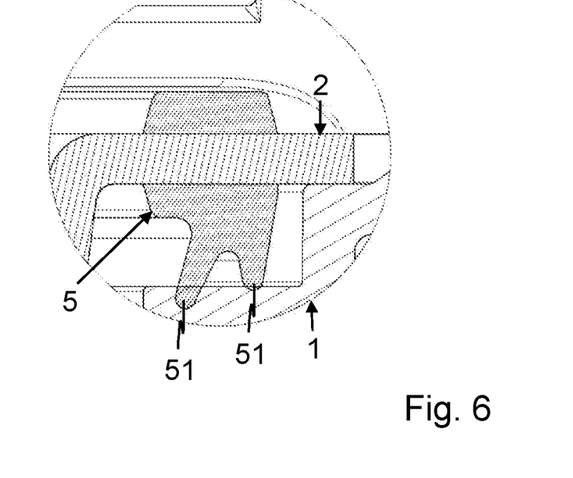
FIG. 6 shows a detail of an alternative seal solution.

A seal attachment that is an alternative to FIG. 5 is illustrated in FIG. 6. The seal 5 in this context is injection molded onto the membrane carrier 2 by a 2-component injection molding process wherein the membrane carrier comprises at least one cutout through which the sealing material is injected. The seal according to this and other embodiments (even for seals that are not connected by injection molding) can also comprise more than one sealing lip 51 which are preferably coaxially, preferably concentrically, arranged to each other. In this context, one of the sealing lips 51 can have a greater length than the other one wherein the axial forces required for compression or reaching the sealing force can be reduced in this way.

LIST OF REFERENCE CHARACTERS 10 degassing unit
1 base body
11 guide bores
12 protective lattice 13 bayonet connecting means
14 locking hook
15 gas passage opening
151 rim of gas passage opening
16 seal receiving groove of the base body
2 membrane carrier
21 guide pin
22 spring guide
23 stop bridge
24 gas passage opening of the membrane carrier
25 sealing lip receiving groove of the membrane carrier
3 cover hood
31 locking openings
32 venting opening
33 spring guide
4 spring element/spiral spring
5 seal/lip seal
51 sealing lip
52 fastening region of the seal
6 semipermeable membrane
61 outer membrane surface
7 housing seal
G gas flow for emergency degassing
H maximum stroke of membrane carrier relative to base body
N emergency degassing opening/flow cross section

What is claimed is:

1. A degassing unit for an electronics housing, the degassing unit comprising:
   a base body configured to be connected fluid-tightly to a rim of a pressure compensation opening of the electronics housing, wherein the base body comprises at least one gas passage opening;
   a membrane carrier;
   a semipermeable membrane fastened fluid-tightly to the membrane carrier, wherein the semipermeable membrane is configured to, in a normal operating state of the degassing unit:
      enable passage of gaseous media from an environment into the electronics housing and in reverse from the electronics housing into the environment;
      prevent passage of liquid media and/or solids; and
   cover the at least one gas passage opening of the base body;
   an axial seal circumferentially extending about a rim of the at least one gas passage opening of the base body,
   wherein the membrane carrier is configured to:
      in the normal operating state, be pressed by an axial force seal-tightly against the axial seal; and
      when a pressure difference between an interior of the electronics housing and the environment is surpassed, lift off the base body, release at least one emergency degassing opening surrounding the semipermeable membrane and transfer the degassing unit into an emergency degassing state;
   one or more pins arranged between the base body and the membrane carrier, wherein the one or more pins are configured to axially guide the membrane carrier when the degassing unit is transferred from the normal operating state into the emergency degassing state and in reverse from the emergency degassing state into the normal operating state; and
   one or more bores configured to respectively guide the one or more pins, wherein a length of the one or more pins in regard to a maximum stroke of the membrane carrier is dimensioned such that even for the maximum stroke the one or more pins are still guided with a minimum length in the one or more bores.

2. The degassing unit according to claim 1, wherein the semipermeable membrane is connected fluid-tightly circumferentially to the membrane carrier.

3. The degassing unit according to claim 2, wherein the membrane carrier comprises an inner side facing the base body, and
   the semipermeable membrane is arranged at the inner side of the membrane carrier.

4. The degassing unit according to claim 1, wherein the membrane carrier comprises an inner side facing the base body,
   the base body comprises an exterior side facing the membrane carrier,
   the axial seal is arranged at the inner side of the membrane carrier or is arranged at the exterior side of the base body, and
   the axial seal comprises at least one sealing lip and is configured to, in the normal operating state, seal the at least one gas passage opening in relation to the semipermeable membrane.

5. The degassing unit according to claim 4, wherein the exterior side of the base body or the inner side of the membrane carrier comprises a seal receiving groove extending circumferentially in relation to the at least one gas passage opening, and
   the axial seal is configured to be held in the seal receiving groove.

6. The degassing unit according to claim 4, wherein the axial seal is injection molded or glued onto the membrane carrier or onto the base body.

7. The degassing unit according to claim 4, wherein the axial seal is arranged at the inner side of the membrane carrier and comprises sealing lips coaxially and concentrically arranged to each other, and
   a length of a first one of the sealing lips is greater than a length of a second one of the sealing lips.

8. The degassing unit according to claim 1, further comprising at least one spring element configured to force the membrane carrier against the base body.

9. The degassing unit according to claim 1, further comprising a cover hood connected to the base body, wherein the cover hood comprises at least one venting opening.

10. The degassing unit according to claim 9, further comprising a spring element comprising a first end and a second end opposite the first end,
    wherein the cover hood comprises an inner surface that is facing the membrane carrier,
    the membrane carrier comprises an outer surface that is facing the cover hood,
    the first end is supported at the inner surface of the cover hood, and
    the second end is supported at the outer surface of the membrane carrier.

11. The degassing unit according to claim 9, wherein the cover hood engages across an outer circumference of the base body at least partially about the outer circumference and is fastened by a locking element engagement to the outer circumference of the base body.

12. The degassing unit according to claim 1, wherein the base body comprises an exterior side that is facing the membrane carrier,
    the membrane carrier comprises an inner side that is facing the base body,
    the one or more bores are arranged at the exterior side of the base body, and the one or more pins are arranged at the inner side of the membrane carrier.

13. The degassing unit according to claim 1, further comprising a fluid-permeable protective lattice covering at least partially the at least one gas passage opening of the base body.

14. The degassing unit according to claim 13, wherein the fluid-permeable protective lattice covers an entire surface of the at least one gas passage opening of the base body.

15. The degassing unit according to claim 13, wherein the fluid-permeable protective lattice and the base body are embodied together as one piece.

16. The degassing unit according to claim 13, wherein the fluid-permeable protective lattice is a separate component connected to the base body.

17. The degassing unit according to claim 16, wherein the base body comprises an inner side that is facing the electronics housing in a mounted state of the degassing unit, and
the fluid-permeable protective lattice is connected to the inner side of the base body.

18. The degassing unit according to claim 1, wherein the base body comprises a bayonet or a thread configured to connect the degassing unit to the electronics housing.

19. The degassing unit according to claim 18, further comprising a housing seal surrounding circumferentially the at least one gas passage opening of the base body at an inner side of the base body that is facing the electronics housing in a mounted state of the degassing unit.

20. The degassing unit according to claim 18, wherein the bayonet axially projects away from an inner side of the base body.

21. The degassing unit according to claim 1, further comprising a housing seal surrounding circumferentially the at least one gas passage opening of the base body at an inner side of the base body that is facing the electronics housing in a mounted state of the degassing unit.

22. The degassing unit according to claim 21, wherein the base body comprises a bayonet or a thread configured to connect the degassing unit to the electronics housing.

23. The degassing unit according to claim 22, wherein the bayonet axially projects away from the inner side of the base body.

24. An electronics housing comprising:
at least one housing wall comprising a pressure compensation opening; and
a degassing unit arranged in a mounted state in the pressure compensation opening and configured to close the pressure compensation opening, wherein the degassing unit comprises:
a base body connected fluid-tightly to a rim of the pressure compensation opening, wherein the base body comprises at least one gas passage opening;
a membrane carrier;
a semipermeable membrane fastened fluid-tightly to the membrane carrier, wherein the semipermeable membrane is configured to, in a normal operating state of the degassing unit:
enable passage of gaseous media from an environment into the electronics housing and in reverse from the electronics housing into the environment;
prevent passage of liquid media and/or solids; and
cover the at least one gas passage opening of the base body;
an axial seal circumferentially extending about a rim of the at least one gas passage opening of the base body, wherein the membrane carrier is configured to:
in the normal operating state, be pressed by an axial force seal-tightly against the axial seal; and
when a pressure difference between an interior of the electronics housing and the environment is surpassed, lift off the base body, release at least one emergency degassing opening surrounding the semipermeable membrane and transfer the degassing unit into an emergency degassing state;
one or more pins arranged between the base body and the membrane carrier, wherein the one or more pins are configured to axially guide the membrane carrier when the degassing unit is transferred from the normal operating state into the emergency degassing state and in reverse from the emergency degassing state into the normal operating state; and
one or more bores configured to respectively guide the one or more pins, wherein a length of the one or more pins in regard to a maximum stroke of the membrane carrier is dimensioned such that even for the maximum stroke the one or more pins are still guided with a minimum length in the one or more bores.

25. The electronics housing according to claim 24, wherein the degassing unit comprises a bayonet, and
the at least one housing wall, in a region surrounding the pressure compensation opening, comprises a counter configured to engage with the bayonet.

26. The electronics housing according to claim 24, wherein the degassing unit comprises a housing seal,
the at least one housing wall comprises, at an exterior side thereof, a sealing surface circumferentially extending about the pressure compensation opening, and
the housing seal is configured to rest against the sealing surface in the mounted state of the degassing unit.

* * * * *